(12) United States Patent
Boykin et al.

(10) Patent No.: US 7,627,593 B2
(45) Date of Patent: Dec. 1, 2009

(54) METHOD AND SYSTEM FOR UNIFIED SUPPORT OF MULTIPLE SYSTEM MANAGEMENT INFORMATION MODELS IN A MULTIPLE HOST ENVIRONMENT

(75) Inventors: James R. Boykin, Pflugerville, TX (US); Alberto Giammaria, Austin, TX (US); Brian J. Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 11/211,952

(22) Filed: Aug. 25, 2005

(65) Prior Publication Data

US 2007/0073877 A1 Mar. 29, 2007

(51) Int. Cl.
*G06F 7/00* (2006.01)
*G06F 17/00* (2006.01)

(52) U.S. Cl. ............................. 707/101; 707/1; 707/100; 707/102; 707/202; 707/205; 709/225; 719/316

(58) Field of Classification Search ............... 707/1, 707/100–102, 202, 205; 709/225; 719/316
See application file for complete search history.

(56) References Cited

U.S. PATENT DOCUMENTS

| | | | |
|---|---|---|---|
| 6,976,262 B1* | 12/2005 | Davis et al. ............... | 719/328 |
| 7,069,321 B1* | 6/2006 | Curtis et al. ............... | 709/225 |
| 2002/0144009 A1* | 10/2002 | Cheng et al. ................ | 709/314 |
| 2003/0217195 A1* | 11/2003 | Mandal et al. .............. | 709/330 |
| 2006/0002705 A1* | 1/2006 | Cline et al. ................... | 398/33 |

OTHER PUBLICATIONS

Lu et al., "MCRM System: CIM-Based Multiple Clusters Manager", Springer Berlin / Heidelberg, Parallel and Distributed Processing and Applications—ISPA 2005 Workshops, 2005, pp. 549-558. Download: http://www.springerlink.com/content/p2u8580x2p267753/fulltext.pdf.*
Liu et al., "WBEM Based Distributed Network Monitoring", Springer Berlin / Heidelberg, Grid and Cooperative Computing—GCC 2004Workshops, 2004, pp. 351-357. Download: http://www.springerlink.com/content/71pI79uI8ryuvh23/fulltext.pdf.*

\* cited by examiner

*Primary Examiner*—John E Breene
*Assistant Examiner*—Hares Jami
(74) *Attorney, Agent, or Firm*—Yee & Associates, P.C.; Jeffrey S. LaBaw (57) ABSTRACT

A method and system for employing Common Information Model (CIM) resources within a data processing system. A request is received for an operation with respect to CIM resources, and a determination is made as to whether the request can be fulfilled locally or remotely. In response to a determination to fulfill the request locally, the request is delegated to local CIM object manager (CIMOM) functionality to obtain result data, e.g., from a local repository or from a locally managed provider. In response to a determination to fulfill the request remotely, the request is delegated to the one or more remote CIMOMs, and the result data is aggregated from a plurality of remote CIMOMs. The result data is then returned to the originator of the request.

11 Claims, 7 Drawing Sheets

METHOD AND SYSTEM FOR UNIFIED SUPPORT OF MULTIPLE SYSTEM MANAGEMENT INFORMATION MODELS IN A MULTIPLE HOST ENVIRONMENT

BACKGROUND OF THE INVENTION

1. Field of the Invention

The present invention relates to an improved data processing system and, in particular, to a method and apparatus for multicomputer system management.

2. Description of Related Art

Computer system management requires information about computer components and network components, the state of each of those items, and their relationships. This information may include discovery of networks, network paths, computers, operating systems, file systems, network cards, installed applications, application components, user transactions, statistics of usage, and other information.

There are many different approaches for discovering and retrieving portions of this information from a computer network and its components and for making this information available to clients. The most common approaches are discipline-specific, domain-specific, or single-host-specific. An example of a discipline-specific approach is the gathering of monitoring and availability information for action upon that information. An example of a domain-specific approach would be the management of J2EE™ resources, such as applications, modules, servlets, EJBs, etc., which is defined within Java™ Specification Request (JSR) 77, the Java™ 2 Platform Enterprise Edition Management Specification. An example of a single-host-specific approach which enables the retrieval of information regarding a computer running the Microsoft™ Windows™ operating system is Microsoft™'s Windows Management Instrumentation (WMI).

However, choosing only one of these approaches is insufficient to identify and/or solve some of today's complex system management problems. Furthermore, implementations of each of these approaches typically make their discovered information available in a proprietary manner. For example, a system administrator would have difficulty in finding the root cause of a problem in a multi-host, multi-disciplne, multi-domain environment in which each approach exposes its information in a different manner and the relevant information comes from multiple hosts. Similarly, a system administrator would have difficulty in determining which hosts, their applications, and their users would be impacted when a particular host, operating system, application, file server, etc., becomes unavailable due to a crash or scheduled system maintenance.

One existing mechanism for exposing information from different domains in a common manner is through the Distributed Management Task Force (DMTF) Common Information Model (CIM). Information is made available through the CIM model by a CIM Object Manager (CIMOM). A CIMOM can maintain information within its repository, and a CIMOM can also be extended with additional information by adding provider plug-ins. CIM has become a common denominator for instrumentation and relationships within the software industry. Significant CIM-based data is currently available to clients in a variety of operating system environments, e.g., Windows™, Solaris™, AIX™, OS/400™ and zOS™ platforms.

Clients can connect to a CIMOM and retrieve desired information. Clients can remotely access this information using the standard protocol that is defined within "DMTF CIM Operations Over HTTP", Version 1.1, Distributed Management Task Force, Inc. (DMTF), 6 Jan. 2003, e.g., in conjunction with the application programming interfaces (APIs) that are defined within "JSR (Java Specification Request) 48: WBEM (Web-Based Enterprise Management) Services Specification", Sun Microsystems, 1 Mar. 2000. JSR 48 defines Java™ APIs for accessing CIM-based data from remote CIMOMs as well as an additional API for extending available CIMOM content with provider plug-ins.

However, there are shortfalls within the CIMOM architecture. Existing CIMOMs do not expose information from more than one host even if the hosts are of the same platform type. Existing CIMOMs also neither support nor manage relationships between more than one host. Moreover, existing CIMOMs do not support models that do not typically coexist or are at different schema levels. Examples of two models that are not found in the same CIMOM are Solaris™-specific and Windows™-specific CIM models. Examples of differing schema levels are the CIM version 2.7 and CIM version 2.8 schemas.

Therefore, it would be advantageous to have a system and a method that has the ability to integrate models and information from multiple types of approaches, hosts, and versions, including modeling and incorporating additional instrumentation as needed where it does not exist. It would also be advantageous to model, create, and manage cross-system and cross-domain relationships, particularly using a programmatic mechanism to expose the information to clients in a unified manner.

SUMMARY OF THE INVENTION

A method and system for employing Common Information Model (CIM) resources within a data processing system. A request is received for an operation with respect to CIM resources, and a determination is made as to whether the request can be fulfilled locally or remotely. In response to a determination to fulfill the request locally, the request is delegated to local CIM object manager (CIMOM) functionality to obtain result data, e.g., from a local repository or from a locally managed provider. In response to a determination to fulfill the request remotely, the request is delegated to the one or more remote CIMOMs, and the result data is aggregated from a plurality of remote CIMOMs. The result data is then returned to the originator of the request.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
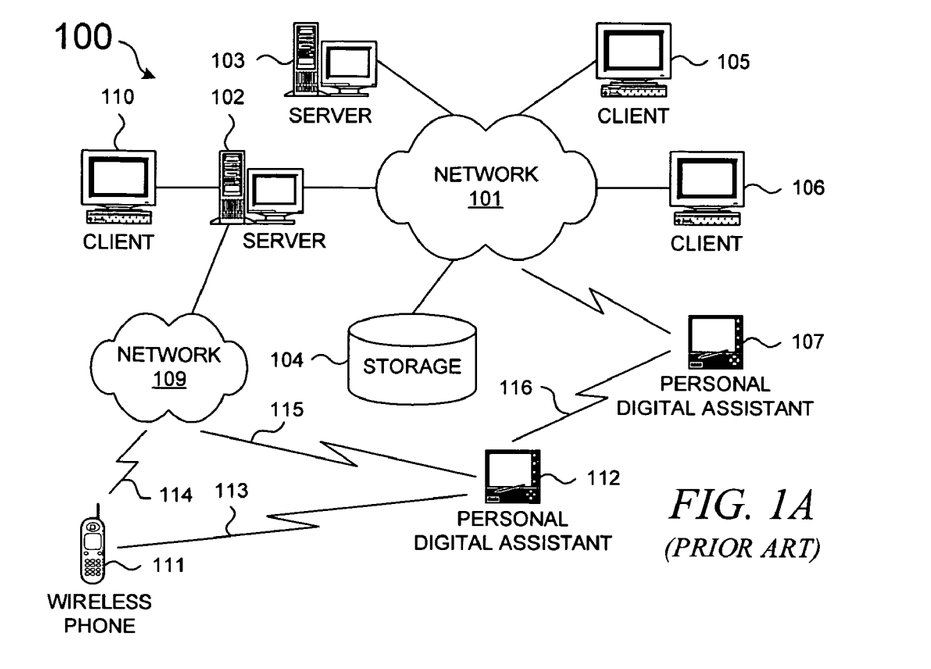
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports network 109 and client 110; network 109 incorporates wireless communication links. Network-enabled phone 111 and PDA 112 can directly transfer data between themselves across wireless link 113 using an appropriate technology, e.g., via Bluetooth™ wireless technology or Wi-Fi technology (IEEE 802.11) that allows the creation of so-called personal area networks (PAN) or personal ad-hoc networks. Phone 111 connects to network 109 through wireless link 114, and PDA 112 connects to network 109 through wireless link 115. In a similar manner, PDA 112 can transfer data to PDA 107 via wireless link 116.

The present invention could be implemented on a variety of hardware platforms; FIG. 1A is intended as an example of a heterogeneous computing environment and not as an architectural limitation for the present invention.

Figure 1B:
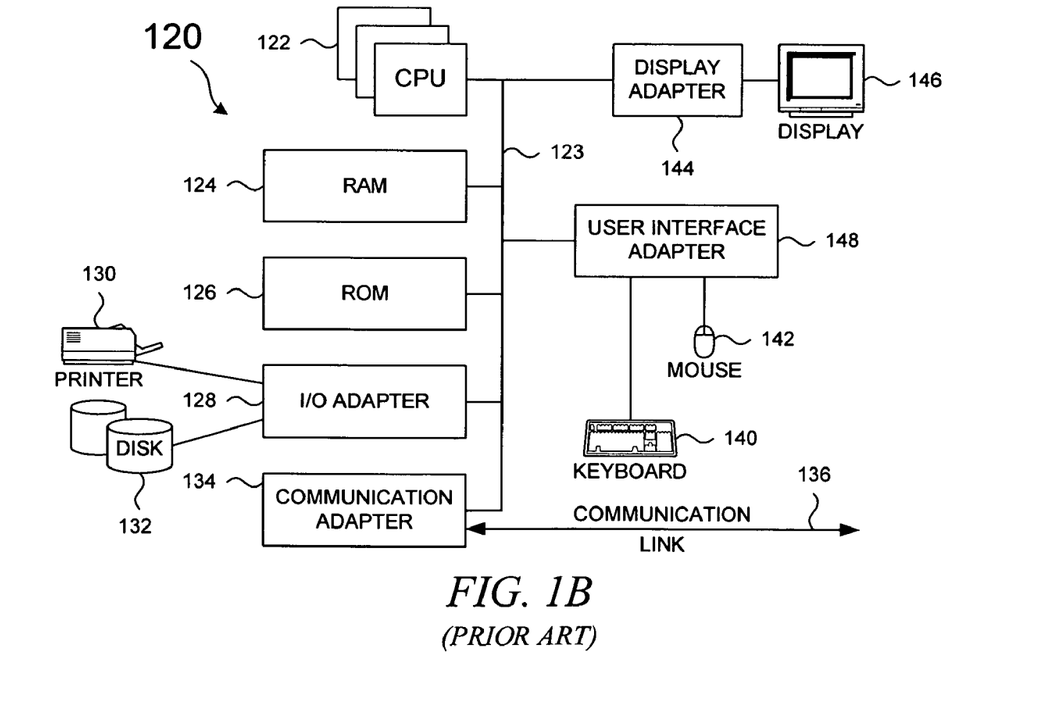
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

It should be appreciated that the hardware in FIG. 1B may vary in different systems. For example, a system may have different processors, such as an Intel® Pentium®-based processor and a digital signal processor (DSP), and different types of memory. Other peripheral devices may be used in addition to or in place of the depicted hardware, which is not meant to imply limitations with respect to the present invention. In addition to being able to be implemented on a variety of hardware platforms, the present invention may be implemented in a variety of software environments. For example, one device may run a Unix® operating system while another device supports a Java® runtime environment.

Figure 2:
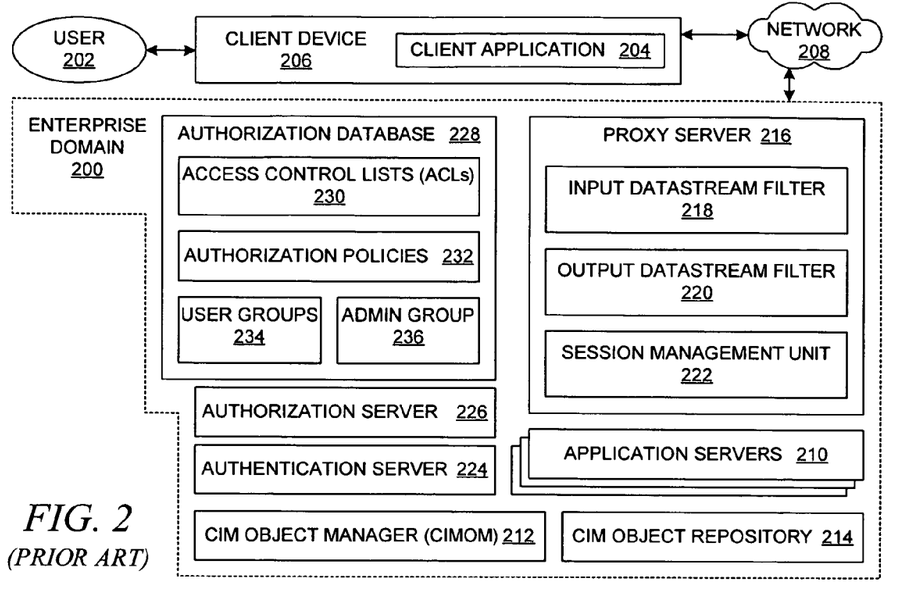
FIG. 2 depicts a block diagram that shows a typical enterprise data processing system with a typical CIMOM.

With reference now to FIG. 2, a block diagram depicts a typical enterprise data processing system. Whereas FIG. 1A depicts a typical data processing system with clients and servers, in contrast, FIG. 2 shows a client within a network in relation to some of the server-side entities that may be used to support client requests to access resources. As in a typical computing environment, enterprise domain 200 hosts resources that user 202 can access, e.g., by using client application 204 on client device 206 through network 208; the computer network may be the Internet, an intranet, or other network, as shown in FIG. 1A.

Enterprise domain 200 supports multiple servers. Application servers 210 support access to controlled resources and/or uncontrolled resources, including web-based applications or other types of back-end applications, including legacy applications. Enterprise domain 200 also contains CIM (Common Information Model) Object Manager (CIMOM) 212 and its object repository 214. CIMOM 212 provides a standardized interface that allows CIM-compliant applications 210 to access management data that is stored within repository 214.

Reverse proxy server 216, or more simply, proxy server 216, performs a wide range of functions for enterprise domain 200. For example, proxy server 216 may cache web pages in order to mirror the content from an application server. Incoming and outgoing datastreams may be processed by input datastream filter 218 and output datastream filter 220, respectively, in order to perform various processing tasks on incoming requests and outgoing responses in accordance with goals and conditions that are specified within various policies or in accordance with a configuration of deployed software modules. Session management unit 222 manages session identifiers, cached credentials, or other information with respect to sessions as recognized by proxy server 216.

The above-noted entities within enterprise domain 200 represent typical entities within many computing environments. However, many enterprise domains have security features for controlling access to protected computational resources. Authentication server 224 may support various authentication mechanisms, such as username/password, X.509 certificates, or secure tokens; multiple authentication servers could be dedicated to specialized authentication methods. Authorization server 226 may employ authorization database 228, which contains information such as access control lists 230, authorization policies 232, information about user groups or roles 234, and information about administrative users within a special administrative group 236. Using this information, authorization server 226 provides indications to proxy server 216 whether a specific request should be allowed to proceed, e.g., whether access to a controlled resource should be granted in response to a request from client 206. It should be noted that the present invention may be implemented in association with a variety of authentication and authorization applications, and the embodiments of the present invention that are depicted herein should not be interpreted as limiting the scope of the present invention with respect to a configuration of authentication and authorization services.

As depicted in the previously described figures, a typical computational environment may include servers that support client applications that request resources from the servers. A computational resource may be an electronic data processing device/subsystem/system, an application, an object, an executable code module, a document, a web page, a file, a database, a database record, various other types of functional units, various other types of information units, or various types of communication functions. A protected or controlled resource is a resource that is only accessible or retrievable if the requesting client or requesting user is authenticated and/or authorized; in some cases, an authenticated user is, by default, an authorized user.

More specifically, though, the present invention is directed to improved system management within data processing environments. Although the present invention may be implemented in view of other system management model specifications, the present invention is described hereinbelow in view of the Common Information Model (CIM) specifications.

The CIM specifications are intended to represent computational resources that constitute a data processing environment and the relationships between those computational resources. The CIM specifications support end-to-end management of the entities within a data processing environment. In summary, the CIM standards and specifications, which are driven by the Distributed Management Task Force, Inc., (DMTF) support a management infrastructure. The CIM specifications describe an approach to system, software, networks, and user management that is based on an object-oriented paradigm. The CIM specifications provide a standard, unified conceptual framework for describing physical and logical objects in a managed environment by organizing information into a hierarchical set of classes that describes the objects in the managed environment. Properties in each class describe the data encapsulated by the class. Objects can be related to other objects by using CIM association classes.

More specifically, according to Common Information Model (CIM) Specification, Version 2.2, Jun. 14, 1999, promulgated by Distributed Management Task Force, Inc. (DMTF), CIM is structured in such a way that a managed environment can be seen as a collection of interrelated systems, each of which is composed of a number of discrete elements. Management schemas are the building blocks for management platforms and management applications, such as device configuration, performance management, and change management. CIM supplies a set of classes with properties and associations that provide a well-understood conceptual framework within which it is possible to organize the available information about a managed environment. Application developers can write code that will operate against the object schema.

CIM itself is structured into these distinct layers: a core model, a common model, and extension schemas; the core model and the common models together are often referred to as the CIM schema. The core model is an information model that captures notions that are applicable to all areas of management. The common model is an information model that captures notions that are common to particular management areas yet independent of a particular technology or implementation. The common areas may include systems, applications, networks, and devices. The information model is specific enough to provide a basis for the development of management applications; this schema provides a set of base classes for extension into the area of technology-specific schemas. Extension schemas represent technology-specific extensions of the common model; these schemas are specific to environments, such as operating systems, e.g., UNIX™ or Microsoft™ Windows™.

The core model is a set of classes, associations and properties that provide a basic vocabulary for analyzing and describing managed systems. The core model represents a starting point for the analyst in determining how to extend the common schema. The common model is a basic set of classes that define various technology-independent areas, such as systems, applications, networks, and devices. The classes, properties, associations and methods in the common model are intended to provide a view of the area that is detailed enough to use as a basis for program design and, in some cases, implementation. Extensions are added below the common model in platform-specific additions that supply concrete classes and implementations of the common model classes. As the common model is extended, it will offer a broader range of information. The extension schemas are technology-specific extensions to the common model. The constructs of a model are stored within a repository, which may be implemented using various types of databases.

The Meta Schema is a formal definition of the model. It defines the terms used to express the model and its usage and semantics. The Unified Modeling Language (UML) may be used to define the structure of the meta schema. The elements of the model are schemas, classes, properties and methods. The model also supports indications and associations as types of classes and references as types of properties.

A schema is a group of classes with a single owner. Schemas are used for administration and class naming. Class names must be unique within their owning schemas. A class is a collection of instances that support the same type: that is, the same properties and methods. Classes can be arranged in a generalization hierarchy that represents subtype relationships between classes. Classes can have methods, which represent the behavior relevant for that class. A class may participate in associations by being the target of one of the references owned by the association. Classes also have instances.

A property is a value used to characterize instances of a class. A property can be thought of as a pair of "get" and "set" functions that, when applied to an object, return state and set state, respectively. A method is a declaration of a signature, i.e. the method name, return type, and parameters, and, in the case of a concrete class, may imply an implementation. A trigger is a recognition of a state change of a class instance and update or access of a property. An indication is an object created as a result of a trigger. Because indications are subtypes of class, they can have properties and methods and be arranged in a type hierarchy.

An association is a class that contains two or more references. It represents a relationship between two or more objects. Because of the way associations are defined, it is possible to establish a relationship between classes without affecting any of the related classes. That is, addition of an association does not affect the interface of the related classes. References define the role each object plays in an association. The reference represents the role name of a class in the context of an association. Associations support the provision of multiple relationship instances for a given object. For example, a system can be related to many system components.

Qualifiers are used to characterize named elements; for example, there are qualifiers that define the characteristics of a property or the key of a class. Qualifiers provide a mechanism that makes the meta schema extensible in a limited and controlled fashion. It is possible to add new types of qualifiers by the introduction of a new qualifier name, thereby providing new types of meta data to processes that manage and manipulate classes, properties and other elements of the meta schema.

In view of the above-described background information, embodiments of the present invention are explained in more detail hereinbelow with respect to the remaining figures.

Figure 3:
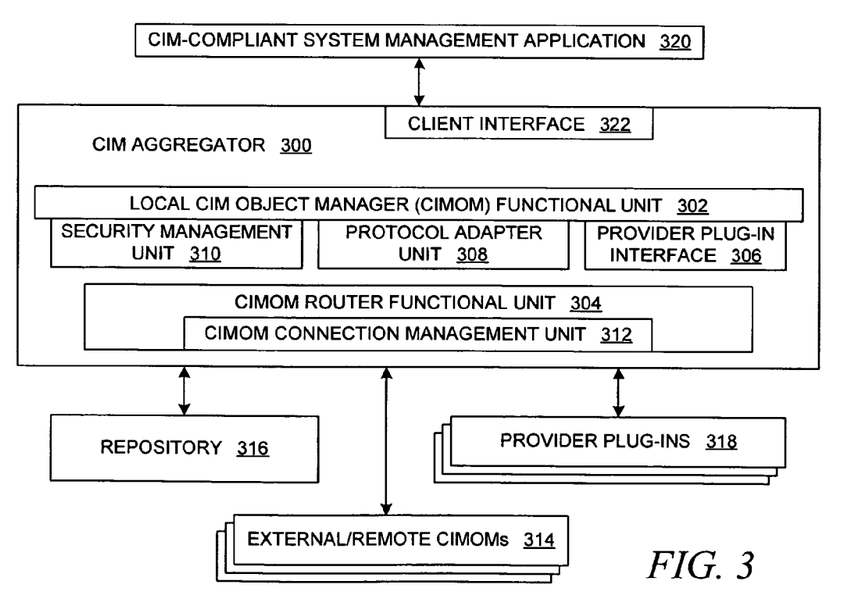
FIG. 3 depicts a block diagram that shows a configuration of components for performing system management via a CIM Aggregator with respect to multiple CIM object managers in accordance with an embodiment of the present invention.

With reference now to FIG. 3, a block diagram depicts a configuration of components for performing system management via a CIM Aggregator with respect to multiple CIM object managers in accordance with an embodiment of the present invention. Within the present invention, a CIM Aggregator extends the standard implementation and semantics of a CIM object manager (CIMOM) in support of CIM-compliant system management applications. A CIM Aggregator acts as a classic CIMOM for requests that are fulfilled locally. In addition, a CIM Aggregator supports multiple, remote, concurrent hosts by routing CIM requests to external CIMOMs as necessary. Hence, in the embodiment that is shown in FIG. 3, the functionality of CIM Aggregator 300 includes the functionality of local CIMOM 302 and the functionality of CIMOM router 304.

Local CIMOM functional unit 302 interacts with typical CIMOM functional units, such as provider plug-in interface 306 for interfacing with provider plug-ins, protocol adapter unit 308 for handling and/or translating messages in accordance with multiple protocols and data formats, and security management unit 310; other possible functional units are not shown. The term "provider plug-in" is equivalent to the term "provider" that is commonly used in a CIM context; the term "provider plug-in" is used herein to distinguish provider plug-ins from other types of computational resources that are employed within the data processing system. CIMOM router 304 includes functional units that enable it to perform its operations, such as CIMOM connection management unit 312 along with other possible functional units that are not shown. CIM connection management unit 312 performs connection management to remote CIMOMs 314, e.g., by maintaining a configurable pool of CIMOM connections. It should be noted, though, that the relationships between any illustrated components may be regarded as logical relationships; hence, CIM Aggregator 300 may not be implemented as a monolithic application that programmatically subsumes local CIMOM 302 and CIMOM router 304 but merely provides interfaces between separately executing components as necessary.

CIM Aggregator 300 supports creation, modification, and deletion of instances of instrumentation and relationships from repository 316, from Aggregator provider plug-ins 318, as well as from all registered remote CIMOMs 314. Instances of instrumentation and relationships can also be retrieved from repository 316, from Aggregator provider plug-ins 318, from a specific remote host, from all remote hosts, or from a combination of all these sources by-way-of a single request to the CIM Aggregator implementation.

Remote CIMOMs are known to the CIM Aggregator through registration information that is available to the CIM Aggregator. After a remote CIMOM is registered with respect to a given CIM Aggregator, the identity or the location of the remote CIMOM is known to the CIM Aggregator. The process by which a remote CIMOM becomes registered with respect to a particular CIM Aggregator may vary without affecting the implementation of the CIM Aggregator. For example, a registry of remote CIMOMs may be deployed as a configuration file or as part of configuration data within a datastore within a system that supports the CIM Aggregator. Alternatively, information about remote CIMOMs might be entered by a system administrator through an administrative utility application, whereby the information about the remote CIMOMs is stored locally with respect to the CIM Aggregator. The registration information about remote CIMOMs may be stored in the local CIM repository.

CIM Aggregator 300 interacts with CIM-compliant system management application 320, e.g., through client interface 322. For example, although client interface 322 may be extended to provide interfacing with novel functionality of CIM Aggregator 300, client interface 322 may support a typical Java™ WBEM client API to support a connection from a CIMOM client, such as system management application 320.

The CIM routing functionality of the CIM Aggregator allows a user, such as a system administrator, the ability to manage multiple CIM hosts as if they were one. System management through CIM typically requires connection to each specific host as needed. However, using the present invention, the CIM Aggregator gives a user the ability to integrate information from multiple, remote hosts with local, pertinent data. The CIM Aggregator removes the requirement for client applications to connect or disconnect to/from different CIMOMs when enumerating instances belonging to different hosts or when navigating cross-system relationships.

Repository 316 provides functionality in support of typical CIMOM behavior; hence, repository 316 may be implemented in a variety of manners as is typical within CIM environments. The repository could be a single file, an embedded CIMOM, a relational database, or some other implementation. In a typical manner, metadata is stored for the supported instrumentation types within repository 316. Metadata stored within the repository includes definitions of CIM name spaces, qualifier types and classes.

However, in support of an implementation of the present invention, repository 316 stores additional information that would not be found within a typical CIMOM implementation. For example, configuration data for a CIM Aggregator may be stored within the repository. This includes CIM classes and instances to configure connections to remote CIMOMs and to manage security for those connections. Configuration data also includes if/which Aggregator provider plug-ins to execute for which CIM classes. Requests for manipulation of metadata are handled as standard CIMOM repository functionality. This includes requests for creation, modification, enumeration, and deletion of CIM namespaces, qualifier types, and classes.

The CIM specifications contain the concept of a CIM Object Path to specify location, type, and identification of an object requested by a client program. In a typical CIM implementation, the location semantic is used to connect to a single CIMOM and then subsequently utilize that single CIMOM; if a connection to another CIMOM is required by the client, then another connection is made by the client, and the second CIMOM is subsequently used. With the present invention, a CIM Aggregator extends the semantic of location to manage a client's connection to multiple CIMOMs concurrently in order to view those multiple connections as one logical CIMOM, as explained in more detail hereinbelow. For instance, if a specific host is identified in the "CIMObjectPath" variable for a CIMOM request, the CIM Aggregator delegates the request to that remote CIMOM only and then returns that remote CIMOM's result to the caller. If, on the other hand, a specific host is not identified in the "CIMObjectPath" for a CIMOM request, the CIM Aggregator will invoke the request on all registered, remote CIMOMs, collect the results from all remote CIMOMs, and then return the collected results to the caller.

A typical CIMOM interface includes a few main types of entry points. The following description of the flowchart figures correspond to a CIM Aggregator's behavior for these types of operations.

Figure 4:
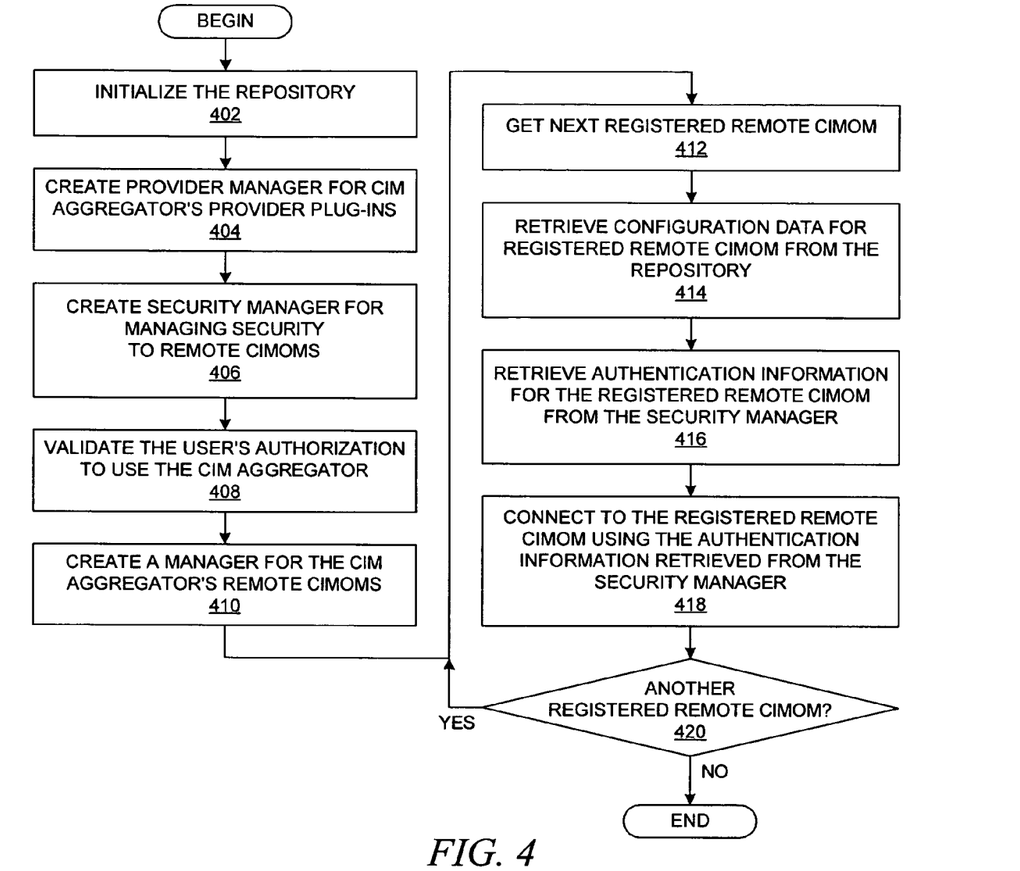
FIG. 4 depicts a flowchart that shows an initialization process for a CIM Aggregator in accordance with an embodiment of the present invention.

With reference now to FIG. 4, a flowchart depicts an initialization process for a CIM Aggregator in accordance with an embodiment of the present invention. The process that is shown in FIG. 4 is performed once upon creation of a CIM Aggregator. The process commences by initializing the repository (step 402). A provider manager for the CIM Aggregator's provider plug-ins is created (step 404), and a security manager for managing security to remote CIMOMs is also created (step 406). An authorization operation is performed to ensure that the user is authorized to use the CIM Aggregator (step 408); if not, then an error message or indication would be returned.

A manager is then created for the CIM Aggregator's remote CIMOMs (step 410), which includes an iterative process involving each registered remote CIMOM. The next unprocessed registered remote CIMOM is determined (step 412), and the configuration data for the registered remote CIMOM is retrieved from the repository (step 414). Authentication information for the registered remote CIMOM is retrieved from the security manager (step 416). The CIM Aggregator then connects to the registered remote CIMOM using the authentication information retrieved from the security manager (step 418). A determination is made as to whether or not another registered remote CIMOM is still unprocessed (step 420), and if so, then the process branches back to step 412 in order to handle it. Otherwise, if a connection has been made to each registered remote CIMOM, then the process is concluded.

Figure 5:
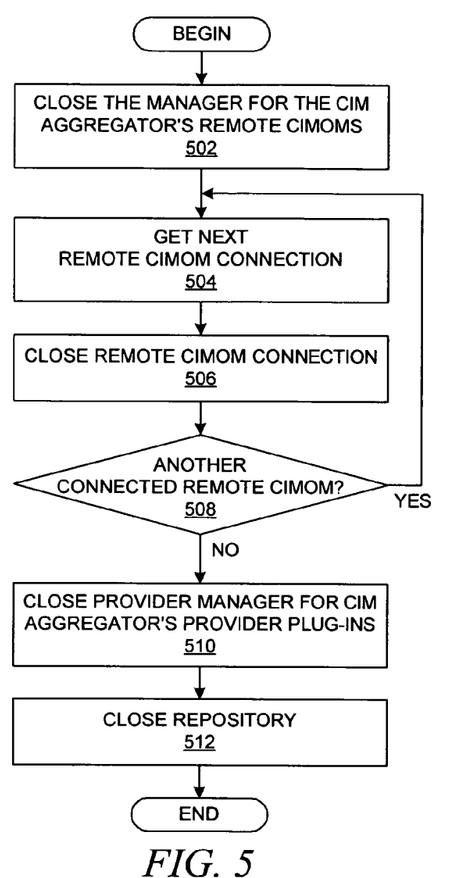
FIG. 5 depicts a flowchart that shows a termination process for a CIM Aggregator in accordance with an embodiment of the present invention.

With reference now to FIG. 5, a flowchart depicts a termination process for a CIM Aggregator in accordance with an embodiment of the present invention. The process that is shown in FIG. 5 is performed once at the close or termination of a CIM Aggregator. The process commences by closing the manager for the CIM Aggregator's remote CIMOMs (step 502), which includes an iterative process involving each registered remote CIMOM to which a connection has been made. The next unprocessed connection to a remote CIMOM is determined (step 504), and the connection is closed (step 506). A determination is made as to whether or not another remote CIMOM connection is still unprocessed (step 508), and if so, then the process branches back to step 504 in order to handle it. Otherwise, the provider manager for the CIM Aggregator's provider plug-ins is closed (step 510). The repository is then closed (step 512), and the process is concluded.

Figure 6:
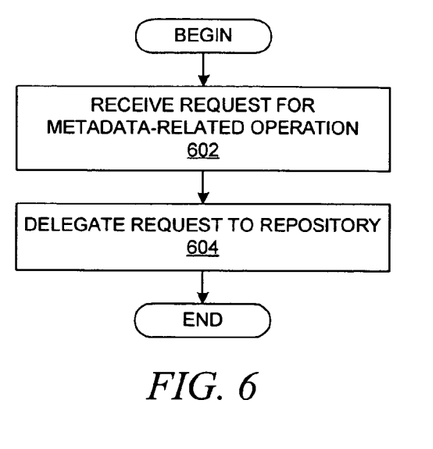
FIG. 6 depicts a flowchart that shows a process for handling requests for metadata-related operations at a CIM Aggregator in accordance with an embodiment of the present invention.

With reference now to FIG. 6, a flowchart depicts a process for handling requests for metadata-related operations at a CIM Aggregator in accordance with an embodiment of the present invention. The process commences when a request is received for a metadata-related operation (step 602). The request is delegated to the repository (step 604), and the process is concluded.

As shown in FIG. 6, all metadata operations are delegated directly to the repository, including all operations that deal directly with creation, modification, enumeration, and deletion of name spaces, qualifier types and classes. Operations that involve relationship definitions between classes are also included. The specific metadata-related operations are: create name space, enumerate name space, delete name space, create qualifier type, set qualifier type, get qualifier type, enumerate qualifier types, delete qualifier type, create class, set class, get class, enumerate class names, enumerate classes, delete class, associator names (for classes), associators (for classes), reference names (for classes) and references (for classes).

Figure 7:
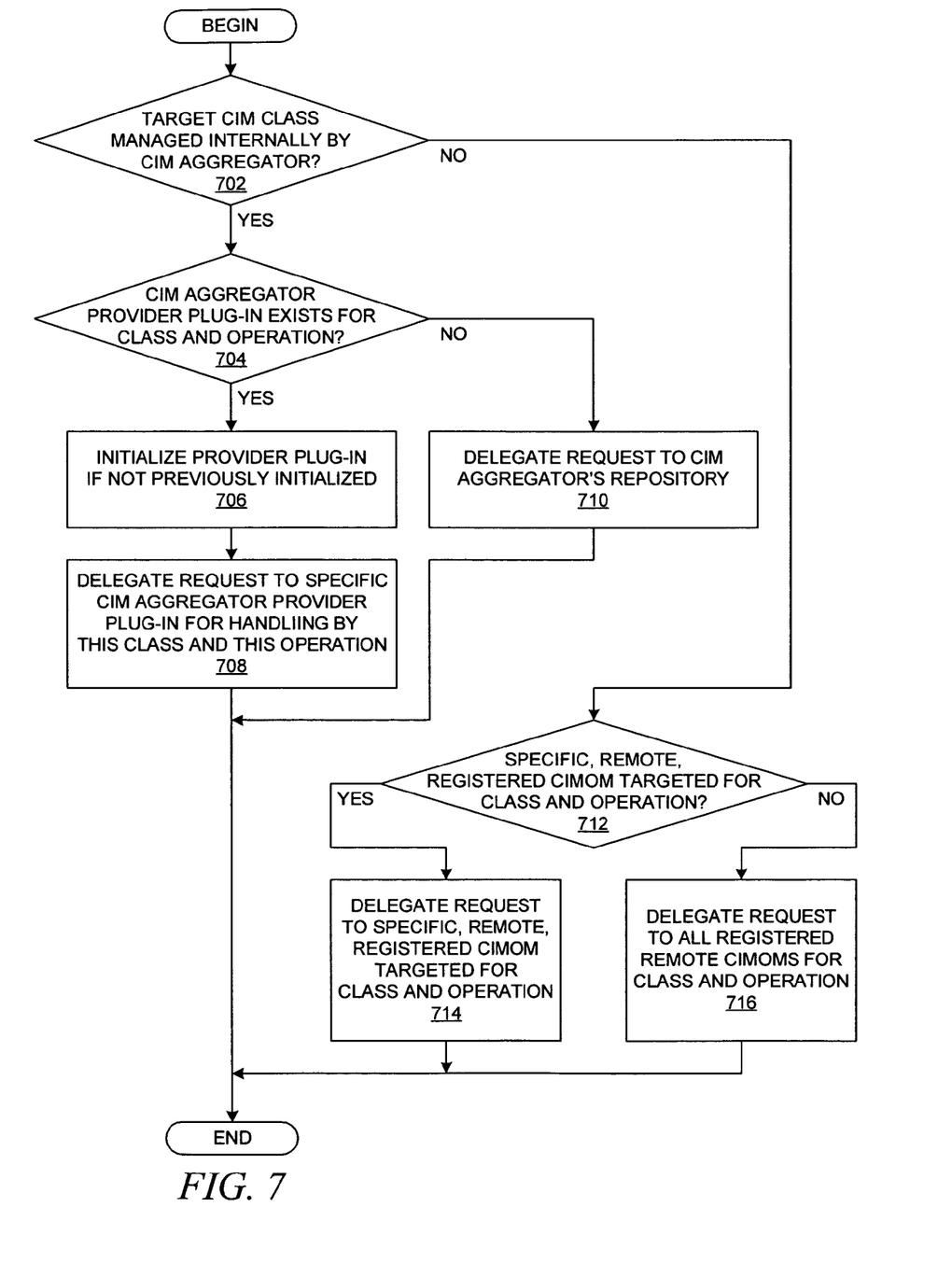
FIG. 7 depicts a flowchart that shows a process for handling certain types of instance-related operations, property-related operations, and method-related operations at a CIM Aggregator in accordance with an embodiment of the present invention.

With reference now to FIG. 7, a flowchart depicts a process for handling certain types of instance-related operations, property-related operations, and method-related operations at a CIM Aggregator in accordance with an embodiment of the present invention. Property-related operations, method-related operations, and instance-related operations that involve creation, modification, and deletion follow the generalized process that is shown in FIG. 7. The process commences with a determination about whether or not the target CIM class for a requested operation from a received request is managed internally by the CIM Aggregator (step 702). If so, then a determination is made as to whether or not there is a CIM Aggregator provider plug-in for this class and this operation (step 704). If so, then the provider plug-in is initialized if not previously initialized (step 706), and the request is delegated to the specific CIM Aggregator provider plug-in for this class and this operation to handle (step 708), and the process is concluded. Otherwise, if the target CIM class for a requested operation is managed internally but there is no CIM Aggregator provider plug-in, then the request is delegated to the CIM Aggregator's repository (step 710), and the process is concluded.

If the target CIM class for a requested operation from a received request is not managed internally by the CIM Aggregator as determined at step 702, then a determination is made as to whether or not there is a specific, remote, registered CIMOM targeted for this operation for this class (step 712). If so, then the request is delegated to the specific, remote, registered CIMOM for this operation for this class (step 714); otherwise, the request is delegated to all the registered remote CIMOMs for this operation for this class (step 716). In either case, the process is then concluded.

Figure 8A:
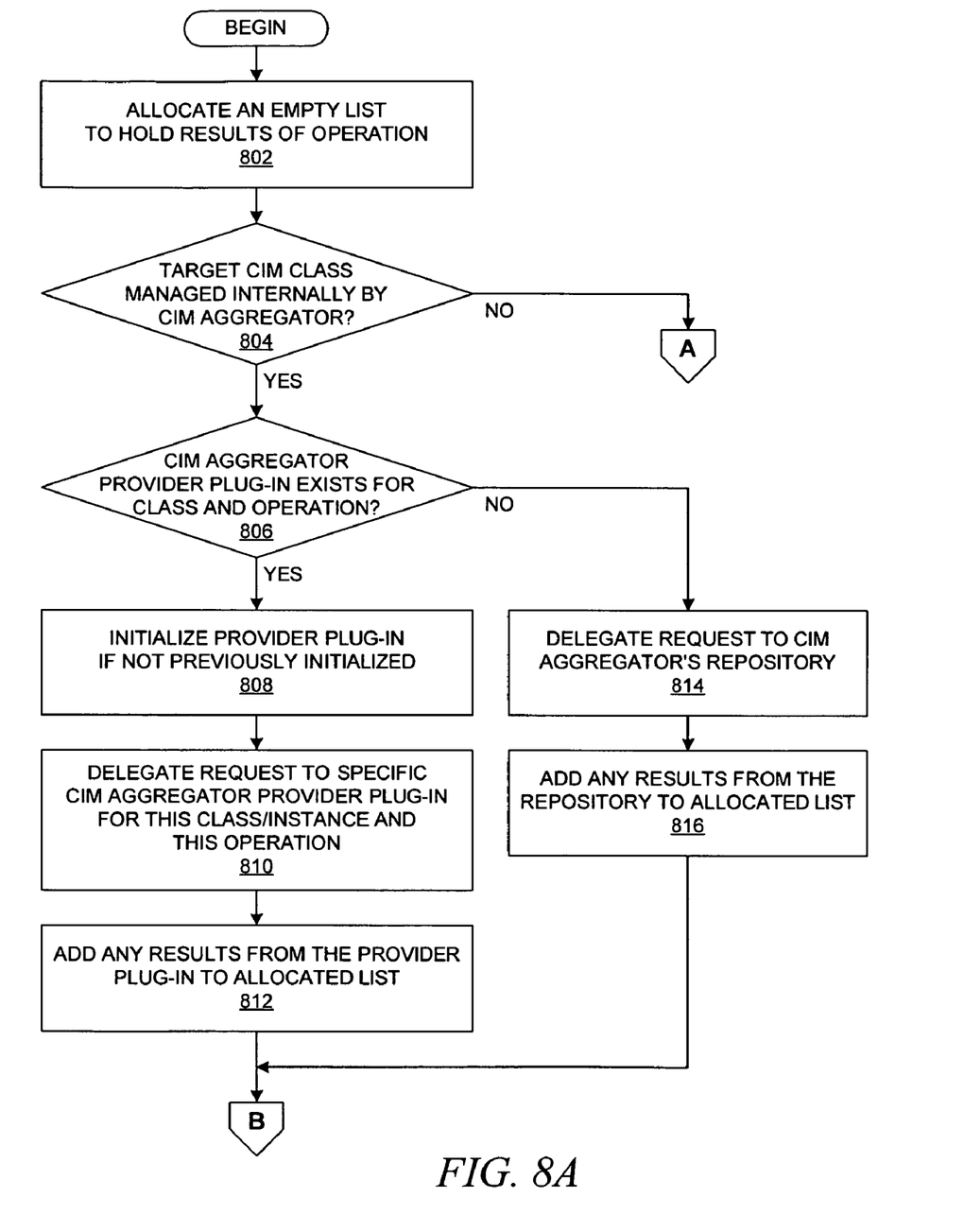
FIGS. 8A-8B depict a flowchart that shows a process for handling certain types of instance-related enumeration operations at a CIM Aggregator in accordance with an embodiment of the present invention.
Figure 8B:
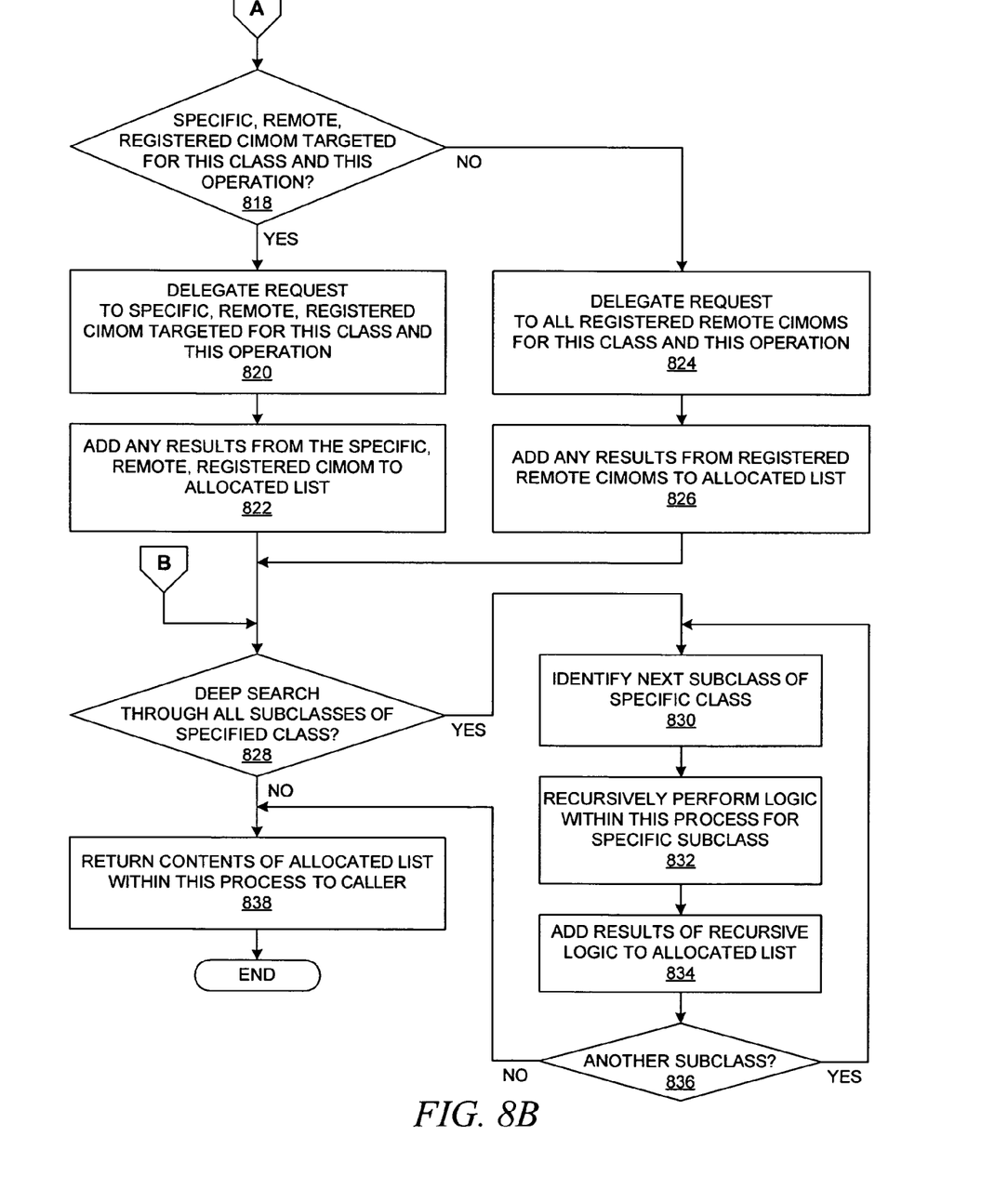

With reference now to FIGS. 8A-8B, a flowchart depicts a process for handling certain types of instance-related enumeration operations at a CIM Aggregator in accordance with an embodiment of the present invention. Instance-related enumeration operations include enumerate instance names, enumerate instances, associator names (for instances), associators (for instances), reference names (for instances) and references (for instances); all of these operations follow the generalized process that is shown in FIGS. 8A-8B.

The process commences with the allocation of an empty data structure, e.g., a list, to hold the results of the requested operation (step 802). A determination is then made as to whether or not the target CIM class for a requested operation from a received request is managed internally by the CIM Aggregator (step 804). If so, then a determination is made as to whether or not there is a CIM Aggregator provider plug-in for this class and this operation (step 806). If so, then the provider plug-in is initialized if not previously initialized (step 808), and the request is delegated to the specific CIM Aggregator provider plug-in for this class and this operation to handle (step 810). Any results of the provider plug-in are added to any previously stored results in the allocated list (step 812). Otherwise, if the target CIM class for a requested operation is managed internally but there is no CIM Aggregator provider plug-in, then the request is delegated to the CIM Aggregator's repository (step 814), and any results from the repository are added to any previously stored results within the allocated list (step 816).

If the target CIM class for a requested operation from a received request is not managed internally by the CIM Aggregator as determined at step 804, then a determination is made as to whether or not there is a specific, remote, registered CIMOM targeted for this operation for this class (step 818). If so, then the request is delegated to the specific, remote, registered CIMOM for this operation for this class (step 820), and any results from the specific, remote, registered CIMOM are added to any previously stored results within the allocated list (step 822). Otherwise, if there is not a specific, remote, registered CIMOM targeted by the requested operation, then the request is delegated to all the registered remote CIMOMs for this operation for this class (step 824), and any results from the specific, remote, registered CIMOM are added to any previously stored results within the allocated list (step 826).

After the requested operation has been handled by an appropriate provider plug-in at step 810, the local repository at step 814, a specific remote CIMOM at step 820, or all appropriate remote CIMOMs at step 824, then a determination is made as to whether or not a deep search through all subclasses of the specified class is necessary (step 828), e.g., by being implied by the requested operation or by being specifically requested by the caller of the operation. If so, then a recursive loop is made through the subclasses of the class that is currently being processed; in other words, for each subclass of a specified class, the logic that is shown within FIGS. 8A-8B is recursively performed on a specific subclass, and the results from the recursive logic flow are added to the results within the allocated list.

This recursion is initiated to another level in FIG. 8B by identifying the next unprocessed subclass of the current specific class (step 830) and then recursively performing the logic within the illustrated process for the identified subclass (step 832), after which the results are added to any previously stored results within the allocated list (step 834). A check is made as to whether there are any other unprocessed subclasses in the currently specified class (step 836); if so, then the process branches back to step 830 to process another subclass, and if not, the loop is exited.

Whether or not a deep search is made through all subclasses of the currently specified class as determined at step 828, the results that have been stored within the allocated list are returned to the appropriate caller (step 838), and the process is concluded. It should be noted that in the process as illustrated in FIGS. 8A-8B, the results of the requested operation are completely determined and collected within the operation before a single value is returned. In an alternative embodiment, an enumeration may be immediately returned to the caller that has requested the operation. When the caller uses the enumeration to request individual entries from the result set, it would be possible at that time to perform the actual retrieval from the repository, CIM Aggregator provider plug-ins, and remote registered CIMOMs.

The advantages of the present invention should be apparent to one having ordinary skill in the art with reference to the detailed description of the present invention that is provided hereinabove. Using the present invention, the CIM Aggregator gives a user the ability to integrate information from multiple, remote hosts with local, pertinent data. The CIM Aggregator removes the requirement for client applications to connect or disconnect to/from different CIMOMs when enumerating instances belonging to different hosts or when navigating cross-system relationships.

For instance, if a CIM Aggregator client application requires details regarding all "CIM_ComputerSystem" resources that are available through the registered CIMOMs, the CIM Aggregator client is able to make a single request to perform a deep instance enumeration of the "CIM_ComputerSystem" class from all registered CIMOMs. Details of all instances of "CIM_ComputerSystem" and its subclasses will be retrieved from each of the registered CIMOMs. This request could, for example, result in a "Win32_ComputerSystem" instance from host "foo", an "IBMAIX_ComputerSystem" instance from host "bar" and a "Solaris_ComputerSystem" instance from host "baz", each instance coming from its own type of host and model. Additionally, details regarding a specific "Win32_ComputerSystem" instance could be requested from a specific registered CIMOM.

By nature of the fact that the CIM Aggregator can reference instances and relationships concurrently from multiple sources, additional CIM Aggregator provider plug-ins can be written to utilize this information to provide relationships between the instances from those sources. This capability gives the user of the CIM Aggregator significant additional capabilities beyond those of standard existing CIMOMs, including the implementation of third-party relationships.

An example of a cross-host, third-party relationship is the "Win32_NetworkConnectionToShare" relationship between a "Win32_NetworkConnection" instance on one host and its supporting "Win32_Share" instance on another host. There are advantages and disadvantages to implementing third-party relationships. The alternatives to the third-party relationship is for the relationship to live on either the source of the relationship or the destination of the relationship. In most cases the source of the relationship is the correct location, but in some instances it is better to have a third party so that if the source goes down or otherwise becomes unavailable, one can still query the relationships. Continuing with the above example, if one wants to determine who is using a "Win32_Share" and the host with the "Win32_NetworkConnection" is unavailable at the time of the query, one would not be able to see the dependency if the dependency existed on the same host as the "Win32_NetworkConnection". However, using a third-party relationship that can be implemented with the present invention, it can be hosted by a third party, and one would be able to see the dependency through an implementation of the present invention.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method operable in a data processing system for managing Common Information Model (CIM) resources at multiple host computer systems within the data processing system, the method comprising:

receiving a request from an originator for a requested operation with respect to the CIM resources, wherein the requested operation is one of creation, modification and deletion of instances of instrumentation and relationships;

determining whether to delegate the request to local CIM object manager (CIMOM) functionality or to a plurality of remote CIMOMs, wherein the step of determining whether to delegate the request to local CIMOM functionality or to a plurality of remote CIMOMs further comprises:

(i) identifying a target CIM class for the requested operation;

(ii) in response to a determination that the target CIM class is not managed locally, determining whether a specific remote CIMOM is targeted by the request for the requested operation;

(iii) in response to a determination that a specific remote CIMOM is not targeted by the request for the requested operation, delegating the request to all of the plurality of remote CIMOMs that are registered for the target CIM class for the requested operation; and (iv) in response to a determination that a specific remote CIMOM is targeted by the request for the requested operation, delegating the request to the specific remote CIMOM;

in response to a determination to delegate the request to local CIMOM functionality, delegating the request received from the originator to the local CIMOM functionality to obtain result data, wherein the step of delegating the request to local CIMOM functionality comprises:

(i) identifying a target CIM class for the requested operation;

(ii) in response to a determination that a provider plug-in does not exist for the target CIM class that is identified, delegating the request to a local repository, wherein the local repository comprises (a) CIM classes and instances to configuration connections to remote CIMOMs, and (b) configuration data that indicates which provider plug-in to execute for which CIM class;

(iii) in response to a determination that the provider plug-in does exist for the target CIM class that is identified, delegating the request to the provider plug-in; and (iv) in response to a determination that the requested operation is a metadata-related operation, delegating the request to the local repository;

in response to a determination to delegate the request to the plurality of remote CIMOMs, delegating the request received from the originator to the plurality of remote CIMOMs and aggregating result data from the plurality of remote CIMOMs; and sending the aggregated result data to the originator of the request.

2. The method of claim 1 wherein the step of determining whether to delegate the request to local CIMOM functionality further comprises:

identifying a target CIM class for the requested operation; and determining whether the target CIM class is managed locally.

3. The method of claim 1 wherein the step of delegating the request to local CIMOM functionality further comprises:

identifying a target CIM class for the requested operation; and in response to a determination that a provider plug-in exists for the target CIM class, delegating the request to the provider plug-in.

4. The method of claim 1 wherein the step of determining whether to delegate the request to a plurality of remote CIMOMs further comprises:

determining whether a specific remote CIMOM is targeted by the request for the requested operation by determining whether a specific host is identified as a "CIMObjectPath" in the request received from the originator in order to determine whether the specific remote CIMOM is targeted by the request.

5. A computer readable storage medium having stored therein a computer program product that is operable by a data processing system for managing Common Information Model (CIM) resources at multiple hosts, the computer program product comprising:

means for receiving a request from an originator for a requested operation with respect to the CIM resources, wherein the requested operation is one of creation, modification and deletion of instances of instrumentation and relationships;

means for determining whether to delegate the request to local CIM object manager (CIMOM) functionality or to a plurality of remote CIMOMs, wherein the step of determining whether to delegate the request to local CIMOM functionality or to a plurality of remote CIMOMs further comprises:

(i) identifying a target CIM class for the requested operation;

(ii) in response to a determination that the target CIM class is not managed locally, determining whether a specific remote CIMOM is targeted by the request for the requested operation;

(iii) in response to a determination that a specific remote CIMOM is not targeted by the request for the requested operation, delegating the request to all of the plurality of remote CIMOMs that are registered for the target CIM class for the requested operation; and (iv) in response to a determination that a specific remote CIMOM is targeted by the request for the requested operation, delegating the request to the specific remote CIMOM;

means for delegating the request received from the originator to the local CIMOM functionality to obtain result data in response to a determination to delegate the request to local CIMOM functionality, wherein the means for delegating the request to local CIMOM functionality comprises:

(i) means for identifying a target CIM class for the requested operation;

(ii) means for delegating the request to a local repository in response to a determination that a provider plug-in does not exist for the target CIM class that is identified, wherein the local repository comprises (a) CIM classes and instances to configuration connections to remote CIMOMs, and (b) configuration data that indicates which provider plug-in to execute for which CIM class;

(iii) means for delegating the request to the provider plug-in in response to a determination that the provider plug-in does exist for the target CIM class that is identified; and (iv) means for delegating the request to the local repository in response to a determination that the requested operation is a metadata-related operation;

means for delegating the request received from the originator to the plurality of remote CIMOMs and means for aggregating result data from the plurality of remote CIMOMs in response to a determination to delegate the request to the plurality of remote CIMOMs; and means for sending the aggregated result data to the originator of the request.

6. The computer program product of claim 5 wherein the means for determining whether to delegate the request to local CIMOM functionality further comprises:

means for identifying a target CIM class for the requested operation; and means for determining whether the target CIM class is managed locally.

7. The computer program product of claim 5 wherein the means for delegating the request to local CIMOM functionality further comprises:

means for identifying a target CIM class for the requested operation; and means for delegating the request to the provider plug-in in response to a determination that a provider plug-in exists for the target CIM class.

8. The computer program product of claim 5 wherein the means for determining whether to delegate the request to a plurality of remote CIMOMs further comprises:

means for determining whether a specific remote CIMOM is targeted by the request for the requested operation by determining whether a specific host is identified as a "CIMObjectPath" in the request received from the originator in order to determine whether the specific remote CIMOM is targeted by the request.

9. A data processing apparatus for managing Common Information Model (CIM) resources at multiple hosts, the data processing apparatus including a hardware data processor and memory coupled to the hardware data processor, the data processing apparatus further comprising:

means for receiving a request from an originator for a requested operation with respect to the CIM resources, wherein the requested operation is one of creation modification and deletion of instances of instrumentation and relationships;

means for determining whether to delegate the request to local CIM object manager (CIMOM) functionality or to a plurality of remote CIMOMs, wherein the means for determining whether to delegate the request to local CIMOM functionality or to a plurality of remote CIMOMs further comprises:

(i) means for identifying a target CIM class for the requested operation;

(ii) means, in response to a determination that the target CIM class is not managed locally, for determining whether a specific remote CIMOM is targeted by the request for the requested operation;

(iii) means, in response to a determination that a specific remote CIMOM is not targeted by the request for the requested operation, for delegating the request to all of the plurality of remote CIMOMs that are registered for the target CIM class for the requested operation; and (iv) means, in response to a determination that a specific remote CIMOM is targeted by the request for the requested operation by determining whether a specific host is identified as a "CIMObjectPath" in the request received from the originator in order to determine whether the specific remote CIMOM is targeted by the request, for delegating the request to the specific remote CIMOM;

means for delegating the request received from the originator to the local CIMOM functionality to obtain result data in response to a determination to delegate the request to local CIMOM functionality, wherein the means for delegating the request to local CIMOM functionality comprises:

(i) means for identifying a target CIM class for the requested operation;

(ii) means for delegating the request to a local repository in response to a determination that a provider plug-in does not exist for the target CIM class that is identified, wherein the local repository comprises (a) CIM classes and instances to configuration connections to remote CIMOMs, and (b) configuration data that indicates which provider plug-in to execute for which CIM class;

(iii) means for delegating the request to the provider plug-in in response to a determination that the provider plug-in does exist for the target CIM class that is identified; and (iv) means for delegating the request to the local repository in response to a determination that the requested operation is a metadata-related operation;

means for delegating the request received from the originator to the plurality of remote CIMOMs and means for aggregating result data from the plurality of remote CIMOMs in response to a determination to delegate the request to the plurality of remote CIMOMs; and means for sending the result data to the originator of the request.

10. The apparatus of claim 9 wherein the means for determining whether to delegate the request to local CIMOM functionality further comprises:

means for identifying a target CIM class for the requested operation; and means for determining whether the target CIM class is managed locally.

11. The apparatus of claim 9 wherein the means for determining whether to delegate the request to the plurality of remote CIMOMs further comprises:

means for determining whether a specific remote CIMOM is targeted by the request for the requested operation.

* * * * *

UNITED STATES PATENT AND TRADEMARK OFFICE
CERTIFICATE OF CORRECTION

PATENT NO. : 7,627,593 B2
APPLICATION NO. : 11/211952
DATED : December 1, 2009
INVENTOR(S) : Boykin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Second Day of November, 2010

David J. Kappos
*Director of the United States Patent and Trademark Office*